United States Patent Office 3,674,536
Patented July 4, 1972

3,674,536
METALLIZED POLYOLEFIN COMPOSITIONS CONTAINING COUMARONE-INDENE RESINS AND METHOD OF PREPARING
Habet M. Khelghatian and Wassily Poppe, Springfield, Pa., assignors to Arisum Corporation, Philadelphia, Pa.
No Drawing. Filed Jan. 6, 1969, Ser. No. 789,423
Int. Cl. B44d 1/092; C23c 3/02
U.S. Cl. 117—47 A
7 Claims

ABSTRACT OF THE DISCLOSURE

Solid, substantially crystalline polyolefin compositions are provided from blends of a polyolefin and from about 1% to about 55% by weight of a compatible thermoplastic adhesion-promoting coumarone-indene resin modifier. The modified compositions may be metallized by conventional electroplating or other metallizing processes to form metallized shaped articles.

BACKGROUND OF THE INVENTION

This invention is directed to the preparation of solid, substantially crystalline polyolefin compositions that may be metallized by known processes to achieve an adherent bond of the metal to the polyolefin substrate. It is well known that plated metal coatings fail to firmly adhere to unmodified polyolefin surfaces. Many processes have been described in the literature that deal with the problem of adherability of metallic coatings to non-conductive surfaces of synthetic polymeric materials. In general, one approach to solving this problem has been to modify the surface of the polyolefin by various surface oxidation processes. For example, the polyolefin article may be chemically etched in an acidic conditioning bath. Other processes have involved a mechanical treatment such as roughening of the polymer surface to provide a substrate of increased surface area that will aid in bonding the deposited metal to the polymer article. Still other processes that aid in improving the bond strength between the metal layer and the polymer article involve application of various adhesive layers to the surface of the polymer article.

Metallizing polyolefin articles in such a manner that the deposited metal is firmly bonded to the polyolefin substrate is very desirable especially in view of recently developed polyolefins that are considered engineering plastics and which may be used as substitutes for various construction materials. A metallized coating having good adhesion to the polyolefin substrate improves the structural properties of the plastic such as resistance to deformation and thereby enhances the use of metallizable polyolefins as a substitute for heavier base materials. Metallized polyolefins provide numerous advantages over plated metals and the most obvious advantage is the reduction in weight. Another is the elimination of highly corrosive bases or substrates. Frequently, a metallized polyolefin article is substituted for an equivalent metal part since tooling costs and finishing costs of buffing and polishing are reduced. In many cases, the speed of molding or casting coupled with the elimination of buffing are important considerations. Good adhesion between the metal coating and the polyolefin substrate improves physical properties such as hardness, abrasion resistance, impact strength, temperature deflection and flexural modulus. Metallized polyolefins may be applied in a wide variety of industrial uses in the automotive, appliance, plumbing, electronic, builders' hardware and other industries.

Although mixtures of atactic polypropylene and a modifier such as a coumarone-indene resin are known as adhesive compositions (British patent specification No. 979,777), heretofore crystalline polyolefins have not been blended with a coumarone-indene resin to improve bond strength between a metal coating and the polyolefin substrate.

SUMMARY OF THE INVENTION

It is an object of this invention to provide solid, substantially crystalline polyolefin compositions having a surface adherent to coatings. Another object is to provide polyolefin compositions that may be metallized to obtain an adherent bond between the metal and the polyolefin substrate. It is a further object of this invention to provide solid, substantially crystalline polyolefin compositions that may be electroplated by a fast plating cycle. Still another object of this invention is to provide metallized polyolefin articles having an adherent metal layer bonded to the polyolefin substrate.

These and other objects of the invention are accomplished by blending into the solid, substantially crystalline polyolefin a compatible thermoplastic adhesion-promoting coumarone-indene resin modifier in an amount of about 1% to about 55% by weight, and preferably about 2.5% to about 20% by weight, based on the total weight of the polyolefin composition. The polyolefins that may be modified include substantially crystalline polymers derived from 1-alkenes having from 2 to 8 carbon atoms.

Coumarone-indene resins useful for the purposes of this invention are known articles of commerce. Preferred coumarone-indene resins have a softening point higher than about 65° C. as determined by the Ring and Ball method and the softening point may be as high as 150° C.

The polyolefin compositions may also contain one or more fillers such as the commonly employed mineral fillers or other additives to modify the composition for a particular application.

DESCRIPTION OF THE INVENTION

The polyolefins treated according to this invention include solid, substantially crystalline polymers which contain a major proportion (i.e., greater than 50%) of an aliphatic olefin, having from 2 to 8 carbon atoms. Such polyolefins, therefore, include polyethylene, substantially crystalline poylpropylene, ethylene propylene block or random copolymers, ethylene butene-1 block or random copolymers, polybutene-1, poly (4-methylpentene-1), poly (3-methylbutene-1), and the like. The term polyolefin as used herein is, furthermore, intended to include copolymers of hydrocarbon monomers with copolymerizable polar monomers in which such functional monomers constitute a minor proportion of the copolymer. Functional monomers frequently employed in combination with hydrocarbon monomers are in particular the acrylic monomers such as methyl methacrylate, ethyl acrylate, and acrylonitrile and the vinyl esters such as vinyl acetate. Particularly useful polyolefins are those that are substantially crystalline polymers derived from 1-alkenes having from 3 to 8 carbon atoms i.e., polymers containing at least 25%, and preferably at least 50% crystallinity as determined by density-crystallinity relationships, a type of technique described by J. A. Gailey et al., SPE Technical Papers (ANTEC), vol. IX, Session IV–1, pages 1 to 4, February 1963.

The coumarone-indene resins that may be blended with a substantially crystalline polyolefin have a softening point of at least about 65° C., as determined by the Ring and Ball method and these resins are widely used in the manufacture of paints and varnishes. The coumarone-indene resins are low molecular weight (generally less than about 3,000 and usually less than about 2,000) thermoplastic resins that may be obtained by polymerizing raw materials of both coal and petroleum origins such as those derived by fractionation of the light oil obtained from coke-oven gas by scrubbing with a heavy petroleum wash oil or from distillation of coal tar. Since unsaturated materials such as methylindenes, styrenes, vinyl toluenes, methylcoumarones and cyclopentadiene are also present in coal-tar oils, the coumarone-indene resins may contain one or more of these materials as copolymers or mixtures of polymers. The coumarone-indence resins are produced by the catalytic and/or thermal polymerization of mixtures containing coumarone, indene and the aforementioned unsaturated materials, but the resins generally consist chiefly of polyindenes. Polymerization catalysts include Friedel-Crafts catalysts and mineral and organic acids. Coumarone-indene resins may also be modified by reaction with a phenol or by hydrogenation. Such phenol-modified coumarone-indene resins and hydrogenated coumarone-indene resins may also be used in this invention and are intended to be included in the term "a coumarone-indene resin."

Coumarone-indene resins are further described in the Encyclopedia of Chemical Technology, volume 4, pp. 594–600, Interscience Encyclopedia, Inc., New York, N.Y., 1949. The technical description in this reference together with the publications listed in the bibliography are hereby incorporated into this disclosure.

The polyolefin compositions may contain fillers, stabilizers, plasticizers, pigments and other additives as needed for particular applications. Commonly employed mineral fillers that may be incorporated into the polyolefin compositions in an amount up to about 50% by weight, based on the total weight of the polyolefin composition, include talc, titanium dioxide, calcium carbonate, bentonite, mica, clay, barium sulfates, glass fibers, wood flour and asbestos fibers. Although employing a filler in the polyolefin composition is optional, the filler appears to provide the additional benefit of aiding substantially uniform incorporation of the thermoplastic resinous modifier throughout the polyolefin composition.

Additional additives that may be incorporated into the polyolefin composition, particularly if metallizable formulations are desired, include surfactants such as the nonionic alkylphenoxypolyalkoxyalkanols having alkyl groups of about 7 to 12 carbon atoms and from about 6 to 60 alkoxy groups. Representative surfactants include octylphenoxypolyethoxyethanols, heptylphenoxypolyethoxyethanols and nonylphenoxypolyethoxyethanols. When used, the surfactants may comprise from about 0.1% to 2% by weight of the polyolefin composition.

The polyolefin and from about 1% to about 55% by weight, based on the total weight of the polyolefin composition, of a compatible thermoplastic adhesion-promoting coumarone-indene resin modifier together with other optional additives may be blended by conventional techniques. For instance, the polyolefin and the thermoplastic resinous modifier may be melt blended and mechanically stirred in such equipment as extruders, stirred mixers or milling rolls and then formed, with cooling, into molded, shaped articles that may subsequently be coated by a metallizing process. Also the polyolefin and modifier in pulverulent form may be dry blended. Alternatively, the polyolefin and the resinous modifier may be dissolved together in a hydrocarbon solvent and precipitated by cooling or by an anti-solvent or by both methods. Another technique useful in blending is to dissolve the components in a hot hydrocarbon solvent such as n-heptane followed by evaporation of the solvent. Following blending, the composition is prepared for a molding or melt-extrusion procedure and a shaping and cooling technique.

The modified polyolefins of the present invention may be shaped into the article desired to be coated by any of the means heretofore employed for the preparation of such articles inclusive of which are compression molding and injection molding. The modified polyolefins are particularly useful as metallizable substrates and metallizing may be accomplished by conventional procedures.

Although a variety of processes have been developed for the metallizing of non-conductive surfaces and in particular, plastics, electroplating and vacuum metallizing are the most common. Although various commercial processes are employed to electroplate a non-conductive substrate, the same general steps are usually employed and these involve conditioning the base member, sensitizing, activating, applying an electroless copper conductor and thereafter electroplating a finish metal to the polyolefin base member. Thus, the plating of articles made from the modified polyolefins of the present invention is generally conducted using the following steps:

(1) The surface to be plated is cleaned using a mild alkaline bath to remove oils, mold release agents and fingerprints.

(2) The alkaline material retained by the surface is neutralized using a mild acid.

(3) The clean surface is then chemically etched with a conditioner containing concentrated mineral acid such as sulfuric acid and chromic trioxide or a chromate.

(4) The resulting etched surface is sensitized with a readily oxidizable tin salt solution such as stannous chloride which causes tin to be absorbed on the surface.

(5) The surface is then activated or nucleated by treatment with an aqueous solution of a noble metal salt such as palladium chloride which forms a metallic film at discrete activated sites.

(6) The activated surface is subjected to electroless plating using copper, nickel, or cobalt as the metal. This is accomplished by immersing a treated surface in a solution of such metal salt containing in addition to the metal salt such as copper sulfate or nickel chloride, a reducing agent such as formaldehyde, trioxymethylene and the like. Sufficient copper, nickel or cobalt is deposited on the surface of the polyolefin article to achieve a continuous coating capable of conducting electricity.

(7) The electrodeposition of metal is then followed by conventional plating of the surface with a finish metal such as copper, nickel and/or chromium or just nickel and chromium. The thickness of the electroplated coating is generally within the range of 0.1 to 1.5 mil.

It is, furthermore, highly desirable if not essential to rinse and clean the surface being treated with water between each of the steps outlined and in some instances, it may also be desirable to dry the surface between the various treating steps. Since the various outlined steps employed in the electroplating of non-conducting surfaces and particularly plastic surfaces are well known in the electroplating art, no further description is deemed necessary for a full understanding of the present invention. The polyolefin compositions of the present invention can be employed in electroplating using any of the processes heretofore developed for electroplating plastic, and particularly polyolefin, surfaces.

Alternatively, a metallic coating may be applied to the polyolefin base member by vacuum metallizing. This well known and conventional procedure involves the principle of evaporation of metals under high vacuum. Representative of typical metals that may be applied using this technique include aluminum, copper and silver. Generally, vacuum metallizing involves the steps of (a) applying a suitable undercoat or prime coat to the polyolefin article, (b) evaporating the desired metal under high vacuum, and (c) applying a topcoat lacquer to protect the thin metallic deposit. Suitable undercoats that are applied to the polyolefin article are well known and are generally a dispersion or solution of an acid containing polymer such as carboxylated butadiene polymers, and maleic anhydride modified atactic polypropylene polymers. As the topcoat, any commercially available thermosetting acrylic lacquer may be used. The deposited metal film is thin and opaque, ranging from thicknesses of 0.15 micron to 1.0 micron.

The polyolefin compositions of the present invention are particularly suitable for electroplating shaped articles made from the modified polyolefins described in this invention in that they give rise to a greatly improved bond strength between the metal plate and the polyolefin substrate. Although the adhesion of metal plate to the substrate can be measured by various tests, bond strength is preferably measured by the pull test in which two parallel cuts are made into the plated metal coating, ½ inch apart and an additional vertical cut is made to form a tab; one end of the resulting tab then being raised sufficiently to allow gripping by a tensile testing machine; the specimen is then placed into a tensile rig and the tab is pulled vertically from the surface. The force required to pull the tab is measured as the bond strength. For most applications a bond strength of 6 to 10 lbs./in. is adequate, but if the plated article in use is to be subjected to mechanical shocks or extremes of temperature, bond strengths up to 25 lbs./in. or more may be desirable.

For purposes of illustrating the invention, the following examples are provided wherein, unless otherwise indicated, all parts and percentages are by weight:

Example 1

(a) A polymer composition is prepared by blending (a) 95 parts of a crystalline polypropylene homopolymer having a flow rate of 3.4 (ASTM–D–1238–62T) and containing 0.5% of dilauryl thiodipropionate, 0.2% of 2,6-ditertiary butyl 4-methyl phenol, 0.15% of calcium stearate and 5% of $TiO_2$, and (b) 5 parts of a thermoplastic coumarone-indene resin modifier (Piccoumaron 410–L, available from Pennsylvania Industrial Chemical Corporation) and having the following characteristics:

| | |
|---|---|
| Ring and Ball softening point ° C | 100 |
| Acid number, maximum | 1 |
| Saponification number, maximum | 1 |
| Specific gravity | 1.09 |
| Refractive index | 1.63 |
| Melt viscosity: | |
| 1 poise at ° C. | 175 |
| 10 poises at ° C. | 140 |
| 100 poises at ° C. | 120 |

The modifier was dry blended at room temperature with the polypropylene for 1½ hours and then melt extruded and ground into molding powder. Plaques, 5" x 5" x 110 mil, were compression molded by conventional apparatus.

The plaques were immersed consecutively in a conditioner consisting of 55% sulfuric acid (96% concentration), 10% potassium dichromate and 35% water for a period of 10 minutes at 80° C.; in a stannous chloride sensitizer solution containing per liter of solution 10 g. of $SnCl_2$ and 40 ml. of HCl at ambient temperatures of 1 to 3 minutes; in an activator solution containing per gallon of solution 1 g. of palladium chloride and 10 ml. of HCl for a period of 1 to 2 minutes at ambient temperatures; and in an electroless copper plating solution containing per liter of solution 29 g. of copper sulfate, 140 g. of Rochelle Salt, 40 g. of sodium hydroxide and 166 g. of formaldehyde (37% solution) at a temperature of 70° C. for a period sufficient to obtain a continuous coating capable of conducting electricity. Between each of the immersions described, the plaque is thoroughly rinsed with distilled water. The resulting plaque on washing with water was then electroplated with copper for about 20 minutes, at a current density of approximately 30 amps/sq. ft., resulting in about a 1 mil coating of copper on the plaque.

The bond strength of the electroplated metal to the polypropylene substrate, as measured by the previously described bond strength test, was 28 lbs./in.

(b) For comparative purposes, the aforementioned plating cycle was repeated with plaques prepared from the same polypropylene containing identical stabilizers and other additives but excluding the adhesion-promoting coumarone-indene resin modifier. Molded plaques from this polypropylene were subjected to the same cycle of conditioning, sensitizing, activating and electroless plating. Severe blistering occurred.

Example 2

Ninety-five parts of a crystalline polypropylene homopolymer having a flow rate of 4.0 (ASTM–1238–62T) and containing 0.3% of dilauryl thiodipropionate, 0.2% of 2,6-ditertiary butyl 4-methyl phenol, 0.2% of calcium stearate, and 0.5% of a nonionic surfactant of t-octylphenoxypolyethoxyethanol having an average of ten polyethoxy units were dry blended with 5 parts by weight, based on the weight of the polypropylene composition, of a coumarone-indene resin having the following characteristics:

| | |
|---|---|
| Ring and Ball softening point ° C | 120 |
| Acid number, maximum | 1 |
| Saponification number, maximum | 1 |
| Specific gravity | 1.10 |
| Refractive index | 1.63 |
| Melt viscosity: | |
| 1 poise at ° C. | 210 |
| 10 poises at ° C. | 175 |
| 100 poises at ° C. | 150 |

Plaques were molded from the blended composition and electroplated according to the process described in Example 1. Comparative bond strengths were obtained.

Example 3

Ninety parts of a polymer composition of a crystalline propylene-ethylene terminal block copolymer having a flow rate of 4.0 and containing 0.3% of distearyl thiodipropionate, 0.2% of calcium stearate, 0.2% of 2,6-ditertiary butyl 4-methyl phenol and 5.0% of $TiO_2$ were modified by blending 10 parts of a phenol-modified coumarone-indene resin (Nevillac Hard, available from Neville Chemical Co., Pittsburgh, Pa.) having a Ring and Ball softening point of 70–80° C.

Molded plaques were electroplated according to the procedure of Example 1 and similar results were obtained.

Example 4

The procedure of Example 3 was repeated with the exception that 75 parts of the same crystalline propylene-ethylene terminal block copolymer was dry blended with 25 parts of a coumarone-indene resin (Piccoumaron 410–H, available from Pennsylvania Industrial Chemical Corporation) having the following characteristics:

| | |
|---|---|
| Ring and Ball softening point ° C | 110 |
| Acid number, maximum | 1 |
| Saponification number, maximum | 1 |
| Specific gravity | 1.10 |
| Refractive index | 1.64 |
| Melt viscosity: | |
| 1 poise at ° C. | 200 |
| 10 poises at ° C. | 170 |
| 100 poises at ° C. | 145 |

Plaques molded from the polyolefin blend were subjected to the same electroplating process described in Example 1. Evaluation of the bond strength gave a result of about 22 lbs./in.

Example 5

Ninety-five parts of the crystalline propylene-ethylene terminal block copolymer described in Example 3 and containing the same additive system was dry blended with five parts of the coumarone-indene resin of Example 1. Good bond strengths were obtained from the electroplated plaques.

We claim:

1. A metallized polyolefin shaped article comprising a polyolefin base member and an adherent metal layer bonded to the polyolefin base member wherein said polyolefin base member contains a blend of a substantially crystalline polyolefin and from about 1% to about 55% by weight, based on the total weight of said base member, of a compatible, thermoplastic coumarone-indene resin.

2. A metallized article according to claim 1 wherein said coumarone-indene resin comprises about 2.5% to about 20% by weight of said base member.

3. A metallized article according to claim 1 wherein said polyolefin is a solid, substantially crystalline propylene polymer.

4. A metallized article according to claim 1 wherein said polyolefin is a solid, substantially crystalline propylene polymer and said coumarone-indene resin has a softening point of at least 65° C.

5. A metallized article according to claim 4 wherein said coumarone-indene resin comprises about 2.5% to about 20% by weight of said base member.

6. In a process for preparing a metallized polyolefin shaped article having an adherent metal layer bonded to the polyolefin base member wherein said article is treated by a metallizing process, the improvement of metallizing a polyolefin base member containing a substantially crystalline polyolefin and from about 1% to about 55% by weight, based on the total weight of said base member, of a compatible resin defined in claim 1.

7. A process according to claim 6 wherein said metallizing process is an electroplating process comprising conditioning, sensitizing, activating, applying electroless copper conductor and thereafter electroplating a finish metal to the polyolefin base member.

References Cited

UNITED STATES PATENTS

| 3,252,844 | 5/1966 | Hechelhammer et al. | 204—30 |
| 3,259,559 | 7/1966 | Schneble et al. | 117—160 |
| 3,402,140 | 9/1968 | Bickel et al. | 260—829 |
| 3,466,232 | 9/1969 | Francis et al. | 117—47 R |
| 3,499,881 | 5/1970 | Poppe et al. | 117—47 R |

ALFRED L. LEAVITT, Primary Examiner

J. A. BELL, Assistant Examiner

U.S. Cl. X.R.

117—138.8, 160; 204—30; 260—829, 897